Figure 1:
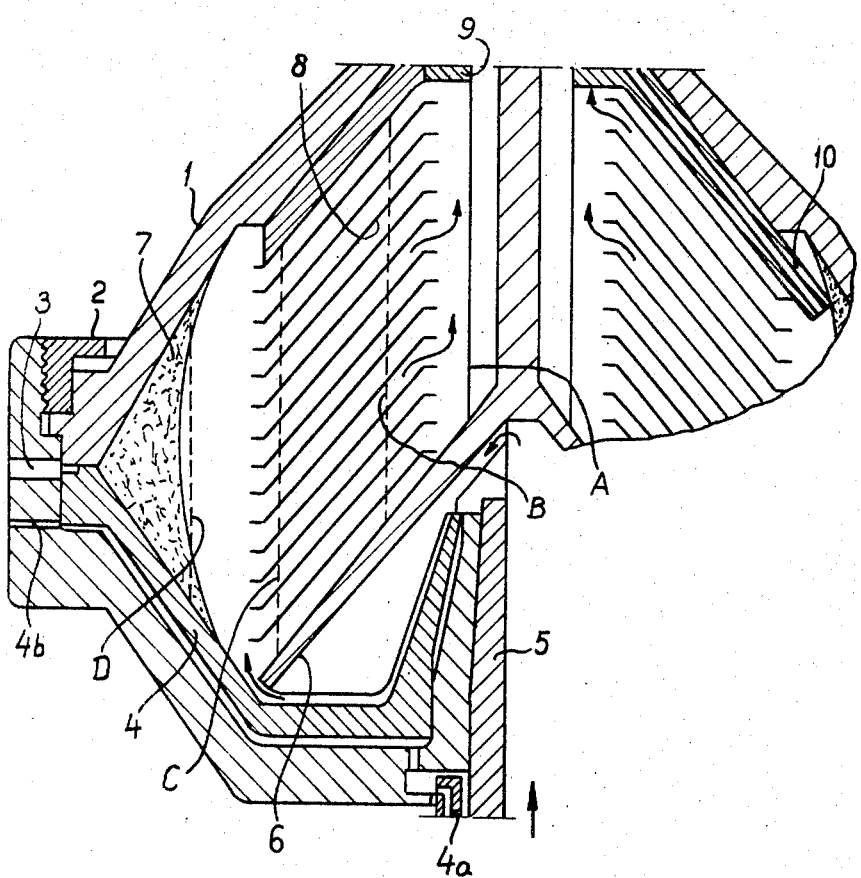

United States Patent
Nilsson

[15] 3,701,469
[45] Oct. 31, 1972

[54] CENTRIFUGE SLUDGE CONTROL AND METHOD OF OPERATING SAME

[72] Inventor: Vilgot Raymond Nilsson, Hagersten, Sweden

[73] Assignee: Alfa-Laval AB, Tumba, Sweden

[22] Filed: Nov. 2, 1970

[21] Appl. No.: 86,218

[52] U.S. Cl. ........................................233/20 A
[51] Int. Cl. ........................................B04b 11/00
[58] Field of Search....233/1 B, 1 C, 1 R, 19 R, 19 A, 233/20 R, 20 A, 46, 47 R; 210/380

[56] References Cited

UNITED STATES PATENTS 3,167,509  1/1965  Steinacker..............233/20 R
3,494,546  2/1970  Nilson....................233/20 R Primary Examiner—Jordan Franklin
Assistant Examiner—George H. Krizmanich
Attorney—Davis, Hoxie, Faithfull & Hapgood

[57] ABSTRACT

When the rotor of a sludge centrifuge is to be emptied of its contents during operation, its peripheral sludge outlets are opened to discharge at least part of the settled sludge; and while liquid is still retained in the rotor, its balance condition is determined by a sensing means. If the latter senses a predetermined degree of unbalance at the prevailing speed of the rotor, as when sludge adheres to the rotor wall and thus fails to discharge, a suitable control is signalled to prevent complete emptying of the rotor at the prevailing speed, thereby avoiding possible damage to the rotor.

9 Claims, 2 Drawing Figures

PATENTED OCT 31 1972 3,701,469

SHEET 1 OF 2

INVENTOR
VILGOT RAYMOND NILSSON
BY
Davis, Hoxie, Faithfull & Hapgood
ATTORNEYS

CENTRIFUGE SLUDGE CONTROL AND METHOD OF OPERATING SAME

The present invention relates to sludge centrifuges of the kind having a rotor with a number of peripheral sludge outlets which are arranged to be closed and opened during the operation of the centrifuge.

Centrifuges of this kind are generally arranged for both partial and total emptying of the rotor. Partial emptying of the rotor means that a part of the sludge which has settled in the so-called sludge space of the rotor during the operation is discharged through the peripheral sludge outlets, while liquid under separation is maintained within the rotor. Total emptying of the rotor means that settled sludge as well as liquid present in the rotor is discharged through the sludge outlets. In partial emptying of the rotor, the supply of liquid to the latter normally is not interrupted; while in total emptying of the rotor, the supply of liquid is interrupted before the sludge outlets are opened.

During continuous operation of a sludge centrifuge of this kind, it is desirable to use partial emptying of the rotor as much as possible. More particularly, once sludge has been separated from the liquid, it is preferable to avoid mixing the sludge again with liquid, as when the rotor is totally emptied through the sludge outlets. In connection with partial emptying of the rotor, provision is therefore made for closing the sludge outlets at such an early stage that a quantity of settled sludge is maintained within the sludge space of the rotor, whereby no part of the liquid under separation is discharged from the rotor together with the sludge.

On certain occasions it is still necessary, however, to empty the rotor of its whole content. Thus, the centrifuge now and then must be cleaned. Moreover, due to various circumstances around the centrifuge, such as functional trouble in another part of the plant where the centrifuge is operating, it is sometimes necessary to stop the centrifuge for a certain period of time. Also, when the operation normally is to be terminated, the rotor is emptied of its content before it is stopped.

Long experience has shown that the rotor, in connection with total emptying operations of this kind, is often brought to a state of unbalance. In certain cases, this unbalance has been so pronounced that the centrifuge has been damaged and has had to be taken out of operation for repair. The unbalance is caused when a portion of the sludge settled within the rotor becomes adhered to the walls of the rotor and thus is not discharged in connection with the partial emptying operations.

Since it has been impossible to indicate this sludge adherence by conventional methods of so-called sludge indication, and since it would be futile to use as an indication of such adherence the unbalance of the rotor when it has been emptied of its content (the latter indication would come too late to avoid rotor damage), it has been necessary to forego separating operations where the risk of adherence is especially pronounced.

The principal object of the present invention is to provide a method and apparatus whereby the above-noted problem is solved.

According to the new method, when the centrifuge rotor is to be totally discharged, at least part of the settled sludge is discharged through the sludge outlets, after which the balance of the rotor is sensed while liquid is still maintained therein. Then, if this sensing shows a predetermined degree of unbalance, total emptying of the rotor is prevented at the prevailing speed of the rotor. By starting total emptying operations in this way, the risk of ensuing machine damage is eliminated. The unbalance caused by any sludge adhering to the rotor and thus sensed will not be as pronounced as it would be if the rotor were immediately totally emptied, since the liquid maintained in the rotor has an equalizing effect on the rotor balance. Accordingly, instead of immediately emptying the rotor totally, it is now possible, if sludge has adhered to the rotor, to reduce the rotor's speed or stop it completely before emptying it of its content.

According to a further feature of the invention, the rotor is gradually emptied of sludge and liquid while the balance of the rotor is being sensed. In order that the equipment necessary for performing the new method may differ as little as possible from the equipment already present at sludge centrifuges of this kind, the rotor is preferably emptied step by step of sludge and liquid.

Normally, when the rotor is to be emptied entirely, the supply of liquid to the rotor is stopped before the opening of the sludge outlets; but in case of exceptionally severe circumstances, it is possible to delay stopping the liquid supply to the rotor until a part or all of the sludge not adhering to the rotor has been discharged through the sludge outlets. Then, due to the presence of a somewhat larger amount of liquid in the rotor, any uneven distribution of sludge adhered to the rotor cannot have as pronounced an effect on the rotor as would be the case if a smaller amount of liquid were present therein.

The invention also relates to apparatus for performing the new method and which will be described in a preferred form presently.

Figure 2:
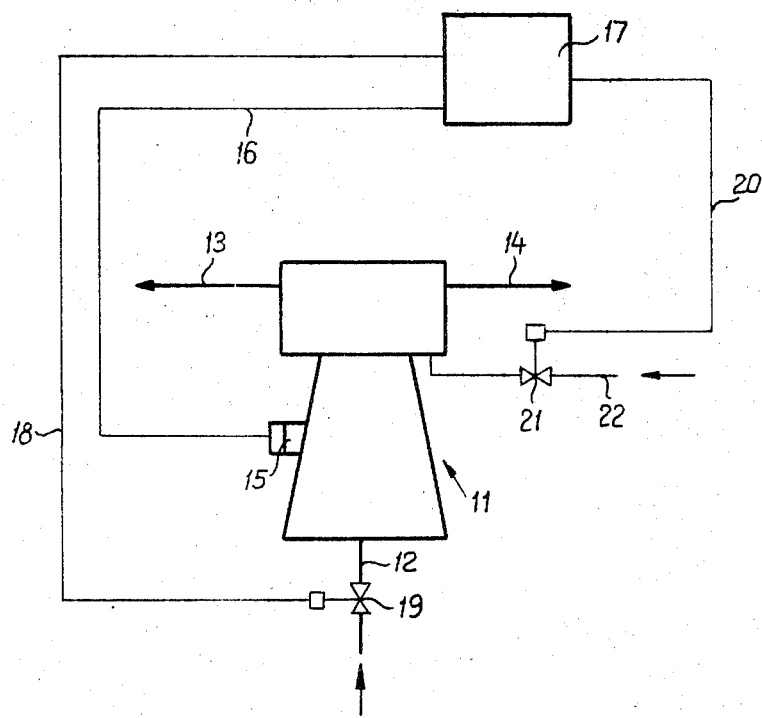

The invention is described below with reference to the accompanying drawings, in which, FIG. 1 is a vertical sectional view of a portion of a sludge centrifuge of the kind involved here, and FIG. 2 shows schematically an arrangement for performing the method according to the invention.

In FIG. 1, a centrifugal rotor 1 comprises two portions which are held together by means of a locking ring 2. In the rotor wall, sludge outlet openings 3 are arranged to be opened and closed in a conventional manner during the operation of the centrifuge by a valve piston means 4. An inlet and an outlet for an operating liquid for the control of the valve piston 4 are shown at 4a and 4b, respectively. The rotor 1 is supported and driven by a hollow shaft 5 having a central channel through which liquid to be separated is supplied to the separating chamber of the rotor. Liquid enters this separating chamber via the lower edge of a distributor 6. Sludge is separated from the liquid and settles at 7, while purified liquid is directed through a disc set 8 to the center of the rotor and from there discharges via an overflow outlet 9. A pipe 10 is part of a so-called sludge indicating means which is not described here in detail.

In FIG. 2, numeral 11 designates a sludge centrifuge having a rotor of the kind shown in FIG. 1. Through a conduit 12, liquid to be separated is led into the centrifuge 11, while purified liquid discharges from the centrifuge through a conduit 13. Sludge separated from the liquid discharges from the centrifuge through a conduit 14.

The centrifuge 11 is provided with means 15 arranged to sense lateral vibrations arising due to the rotor 1 becoming out of balance. Means of this kind are well known in the art and need not be described in detail. The sensing means 15 are connected through a connection 16 to a control unit 17 arranged to control the operation of the sludge centrifuge. Through a connection 18, the control unit 17 thus may control a valve 19 in the inlet conduit 12 for liquid to be separated; and through a connection 20, it may control a valve 21 in a supply conduit 22 for operating liquid, the conduit 22 leading to the operating liquid inlet 4a (FIG. 1). By stopping the flow of operating liquid to the centrifuge during a shorter or longer period of time, the control unit 17 may provide for either partial or total emptying of the rotor 1 according to a predetermined program.

When the rotor 1 is to be emptied totally according to the predetermined program, the supply of liquid to the rotor through the conduit 12 is stopped by closing of the valve 19. Then, during a very short period of time, the supply of operating liquid through the conduit 22 is stopped by closing of the valve 21. Simultaneously the connection 16 between the vibration sensing means 15 and the control unit 17 is temporarily broken. Due to the interruption of the operating liquid supply, the valve piston 4 moves quickly downward, but it will return immediately to its closing position shown in FIG. 1 when the supply of operating liquid is resumed. During the short period of time when the sludge outlets 3 of the rotor are thus opened, the sludge 7 and a quantity of liquid will discharge through these outlets. The liquid level in the rotor, which initially was situated at A in FIG. 1, now has moved to C. Immediately after the re-closing of the sludge outlets 3, the connection 16 between the vibration sensing means 15 and the control unit 17 is re-established. If a portion of the sludge 7 settled in the rotor has adhered to the rotor wall, and thus has not discharged through the sludge outlets 3 during the above-described operation, this sludge portion will cause an unbalance of the rotor which is sensed as heavy vibrations by the sensing means 15. A signal is then transmitted from the sensing means 15 through the connection 16 to the control unit 17, causing the latter to stop the planned total emptying operation. This interruption may effect an alarm signal from the control unit 17, or it may automatically cause certain operations to be performed. For example, it may cause the speed of the rotor to be reduced to a speed at which a continued total emptying of the rotor is possible without any risk of machine damage, after which the rotor is stopped entirely in order to be freed manually from the sludge adhered to the rotor in the sludge space. Alternatively, the rotor may be stopped entirely without having been emptied. However, if no substantial vibrations are sensed by the means 15 when the liquid level within the rotor is situated at C, the control unit 17 continues to provide for total emptying of the rotor while it is rotating at its normal speed of operation.

The above-described method of operation may be used in cases where the adherence of sludge is not expected to be very pronounced. However, if the settled sludge is of a kind which very easily adheres to the rotor wall and perhaps has much greater density than the purified liquid, it may be suitable to start a total emptying operation by discharging only a part of the settled sludge. The free liquid surface in the rotor then will be moved only to a level B (FIG. 1) before the discharge operation is interrupted and the means 15 sense whether unbalance of the rotor has arisen. For the sake of safety, small quantities of the rotor content may then be discharged intermittently, so that the free liquid surface in the rotor will also take the positions C and D before the rotor can be emptied entirely. If the means 15 senses pronounced vibrations at any time when the liquid surface is situated at any of these levels B, C and D, a signal is transmitted through connection 16 to the control unit 17 which, for instance in the manner described above, prevents total emptying of the rotor at its normal speed of operation.

The present invention is not limited to the particular kind of operating mechanism described in connection with the sludge centrifuge shown in the drawings. Any other suitable equipment, of course, may be used. Further, it is possible to use other suitable means for sensing whether sludge has adhered to the rotor.

I claim:

1. In the operation of a sludge centrifuge including a centrifugal rotor to which a sludge-liquid mixture is fed and having peripheral sludge outlets adapted to be opened and closed during operation of the centrifuge, the method for use when emptying the rotor of its contents, which comprises the steps of opening said outlets to discharge at least part of the settled sludge therethrough while rotating the rotor, then sensing the balance of the rotating rotor while maintaining liquid therein, and, in response to said sensing of a predetermined degree of unbalance of the rotor, preventing emptying of the rotor at the speed at which it is rotating during said sensing.

2. The method of claim 1, comprising also gradually emptying the rotor of sludge and liquid while sensing the balance of the rotor.

3. The method of claim 2, in which the rotor is emptied of sludge and liquid step by step.

4. The method of claim 3, in which said sensing of the rotor balance is effected only between the points of time represented by said step by step emptying.

5. The method of claim 1, comprising also discharging some of said liquid through said outlets prior to said sensing.

6. The method of claim 1, comprising also stopping the feed of said mixture to the rotor before effecting said discharge therefrom.

7. The method of claim 1, comprising also stopping the feed of said mixture to the rotor when at least said part of the sludge has been discharged through said outlets.

8. A sludge centrifuge comprising a rotor provided with an inlet for a sludge-liquid mixture and also provided with peripheral sludge outlets adapted to be opened and closed during operation of the centrifuge, discharge means for opening said outlets to commence emptying the rotor of its contents, means for sensing the balance of the rotor while liquid is still maintained therein and while the rotor is at an operating speed, and means operatively connected to the sensing means and responsive to said sensing of a predetermined degree of rotor unbalance for preventing emptying of the rotor at said operating speed.

9. A sludge centrifuge according to claim 8, in which said discharge means are operable to open said outlets intermittently to empty the rotor in a plurality of steps, said sensing and responsive means being operable to prevent said emptying in response to said unbalance arising from any of said emptying steps.

* * * * *